US012531989B2

(12) United States Patent
Xu et al.

(10) Patent No.: US 12,531,989 B2
(45) Date of Patent: Jan. 20, 2026

(54) METHOD FOR VIDEO PROCESSING, ELECTRONIC DEVICE, AND STORAGE MEDIUM

(71) Applicant: SHANGHAI SENSETIME INTELLIGENT TECHNOLOGY CO., LTD., Shanghai (CN)

(72) Inventors: Tongda Xu, Shanghai (CN); Chenjian Gao, Shanghai (CN); Yan Wang, Shanghai (CN); Tao Yuan, Shanghai (CN); Hongwei Qin, Shanghai (CN)

(73) Assignee: SHANGHAI SENSETIME INTELLIGENT TECHNOLOGY CO., LTD., Shanghai (CN)

( * ) Notice: Subject to any disclaimer, the term of this patent is extended or adjusted under 35 U.S.C. 154(b) by 74 days.

(21) Appl. No.: 18/444,824

(22) Filed: Feb. 19, 2024

(65) Prior Publication Data

US 2024/0195968 A1   Jun. 13, 2024

Related U.S. Application Data

(63) Continuation of application No. PCT/CN2022/078398, filed on Feb. 28, 2022.

(30) Foreign Application Priority Data

Aug. 20, 2021   (CN) .......................... 202110961276.6

(51) Int. Cl.
*H04N 19/124*   (2014.01)
*H04N 19/119*   (2014.01)
(Continued)

(52) U.S. Cl.
CPC ......... *H04N 19/124* (2014.11); *H04N 19/119* (2014.11); *H04N 19/14* (2014.11); *H04N 19/172* (2014.11); *H04N 19/176* (2014.11)

(58) Field of Classification Search
None
See application file for complete search history.

(56) References Cited

U.S. PATENT DOCUMENTS 7,551,773 B2 *   6/2009   Bergman .............. H04N 19/126
382/233
8,064,517 B1 *   11/2011   Viscito ................. H04N 19/176
375/240.03
(Continued)

FOREIGN PATENT DOCUMENTS

CN   106664412 A   5/2017
CN   109076212 A   12/2018
(Continued)

OTHER PUBLICATIONS

International Search Report in the international application No. PCT/CN2022/078398, mailed on Apr. 27, 2022, 2 pages.
(Continued)

*Primary Examiner* — Mohammad J Rahman
(74) *Attorney, Agent, or Firm* — Cooper Legal Group, LLC

(57) ABSTRACT

A video processing method, an electronic device and a storage medium are provided. The method includes: a target frame is determined in a video to be processed; at least two first energy images corresponding to the target frame are determined based on at least two preset macro block sizes respectively, each first energy image represents alternating current energy of first macro block(s) corresponding to a respective macro block size and the first macro block(s) are obtained by segmenting the target frame based on the respective macro block size; a first energy map corresponding to the target frame is determined based on the first energy images, the first energy map represents energy distribution in the target frame; and an adaptive quantization parameter corresponding to the target frame is determined based on the
(Continued)

first energy map and the target frame is encoded using the adaptive quantization parameter.

16 Claims, 9 Drawing Sheets

(51) Int. Cl.
*H04N 19/14* (2014.01)
*H04N 19/172* (2014.01)
*H04N 19/176* (2014.01)

(56) References Cited

U.S. PATENT DOCUMENTS

| | | | |
|---|---|---|---|
| 9,628,803 B2* | 4/2017 | He | H04N 19/61 |
| 10,924,741 B2* | 2/2021 | Jou | H04N 19/176 |
| 2002/0181583 A1* | 12/2002 | Corbera | H04N 19/154 |
| | | | 375/E7.157 |
| 2005/0084007 A1* | 4/2005 | Lightstone | H04N 19/154 |
| | | | 375/E7.181 |
| 2007/0271321 A1* | 11/2007 | Reznik | G06F 17/147 |
| | | | 708/402 |
| 2014/0140396 A1* | 5/2014 | Wang | H04N 19/126 |
| | | | 375/240.03 |
| 2015/0215574 A1* | 7/2015 | Hinds | H04N 19/60 |
| | | | 348/441 |
| 2016/0088298 A1* | 3/2016 | Zhang | H04N 19/176 |
| | | | 375/240.03 |
| 2016/0150230 A1 | 5/2016 | He | |
| 2018/0376153 A1* | 12/2018 | Gokhale | H04N 19/147 |
| 2019/0028707 A1* | 1/2019 | Yu | G06T 3/18 |
| 2020/0219285 A1* | 7/2020 | Faramarzi | H04L 65/70 |
| 2021/0006802 A1 | 1/2021 | Zhao | |
| 2021/0368177 A1* | 11/2021 | Reznic | H04N 19/46 |
| 2022/0303538 A1* | 9/2022 | Zeng | H04N 19/14 |

FOREIGN PATENT DOCUMENTS

| | | |
|---|---|---|
| CN | 110365983 A | 10/2019 |
| CN | 111836044 A | 10/2020 |
| CN | 111866504 A | 10/2020 |
| CN | 112073723 A | 12/2020 |
| CN | 112243126 A | 1/2021 |
| CN | 113612999 A | 11/2021 |

OTHER PUBLICATIONS

English translation of the Written Opinion of the International Search Authority in the international application No. PCT/CN2022/078398, mailed on Apr. 27, 2022, 6 pages.

Jong-Hyeok Lee, "Efficient Color Artifact Removal Algorithm Based on High-Efficiency Video Coding (HEVC) for High-Dynamic Range Video Sequences", IEEE Access, Received Mar. 12, 2020, accepted Mar. 25, 2020, date of publication Mar. 30, 2020, date of current version Apr. 16, 2020, Digital Object Identifier 10.1109/ACCESS.2020.2984012, the whole document, 13 pages.

Shiyan Zhang, "Advanced Techniques for High-efficiency Video Coding", A Master Thesis Submitted to University of Electronic Science and Technology of China, Mar. 31, 2020, the whole document, 71 pages with English abstract.

* cited by examiner

METHOD FOR VIDEO PROCESSING, ELECTRONIC DEVICE, AND STORAGE MEDIUM

CROSS-REFERENCE TO RELATED APPLICATION(S)

This application is a continuation of International Patent Application No. PCT/CN2022/078398, filed on Feb. 28, 2022, which is based upon and claims priority to Chinese patent application No. 202110961276.6, filed on Aug. 20, 2021 and entitled "VIDEO PROCESSING METHOD AND APPARATUS, ELECTRONIC DEVICE AND STORAGE MEDIUM". The contents of International Patent Application No. PCT/CN2022/078398 and Chinese patent application No. 202110961276.6 are hereby incorporated by reference in their entireties.

BACKGROUND

In the field of video coding, in order to improve visual quality of a video, a macro block-level adaptive quantization method can be used to allocate more bit rates for smooth regions of video frames. However, the above method usually has the disadvantage of being difficult to adapt to complex scenarios in encoding.

SUMMARY

The present disclosure relates to the field of video coding, and provides a method for video processing, an electronic device, and a storage medium.

In a first aspect, an embodiment of the present disclosure provides a method for video processing, which includes the following operations.

A target frame is determined in a video to be processed.

At least two first energy images corresponding to the target frame are determined based on at least two preset macro block sizes, respectively. Herein, each of the first energy images represents alternating current energy of at least one first macro block corresponding to a respective one of the macro block sizes. Herein, the at least one first macro block is obtained by segmenting the target frame based on the respective macro block size.

A first energy map corresponding to the target frame is determined based on the first energy images. Herein, the first energy map represents energy distribution in the target frame.

An adaptive quantization parameter corresponding to the target frame is determined based on the first energy map and the target frame is encoded by using the adaptive quantization parameter.

In a second aspect, an embodiment of the present disclosure provides an electronic device, which includes a processor; and a memory for storing instructions that, when executed by the processor, cause the processor to: determine a target frame in a video to be processed; determine at least two first energy images corresponding to the target frame based on at least two preset macro block sizes, respectively, herein, each of the first energy images represents alternating current energy of at least one first macro block corresponding to a respective one of the macro block sizes, and the at least one first macro block is obtained by segmenting the target frame based on the respective macro block size; determine a first energy map corresponding to the target frame based on the first energy images, herein, the first energy map represents energy distribution in the target frame; and determine an adaptive quantization parameter corresponding to the target frame and encode the target frame by using the adaptive quantization parameter.

In a third aspect, an embodiment of the present disclosure provides a non-transitory computer-readable storage medium for storing computer program instructions that, when executed by a processor, cause the processor to perform the following operations.

A target frame is determined in a video to be processed.

At least two first energy images corresponding to the target frame are determined based on at least two preset macro block sizes, respectively. Herein, each of the first energy images represents alternating current energy of at least one first macro block corresponding to a respective one of the macro block sizes. Herein, the at least one first macro block is obtained by segmenting the target frame based on the respective macro block size.

A first energy map corresponding to the target frame is determined based on the first energy images. Herein, the first energy map represents energy distribution in the target frame.

An adaptive quantization parameter corresponding to the target frame is determined based on the first energy map and the target frame is encoded by using the adaptive quantization parameter.

It should be understood that the above general description and the following detailed description are exemplary and explanatory only and are not limiting to the present disclosure. Other features and aspects of the present disclosure will become apparent from the following detailed description of exemplary embodiments with reference to the accompanying drawings.

BRIEF DESCRIPTION OF THE DRAWINGS

The accompanying drawings, which are incorporated in and constitute a part of the specification, illustrate embodiments consistent with the present disclosure and, together with the description, serve to explain the technical solutions of the present disclosure.

DETAILED DESCRIPTION

Figure 1:
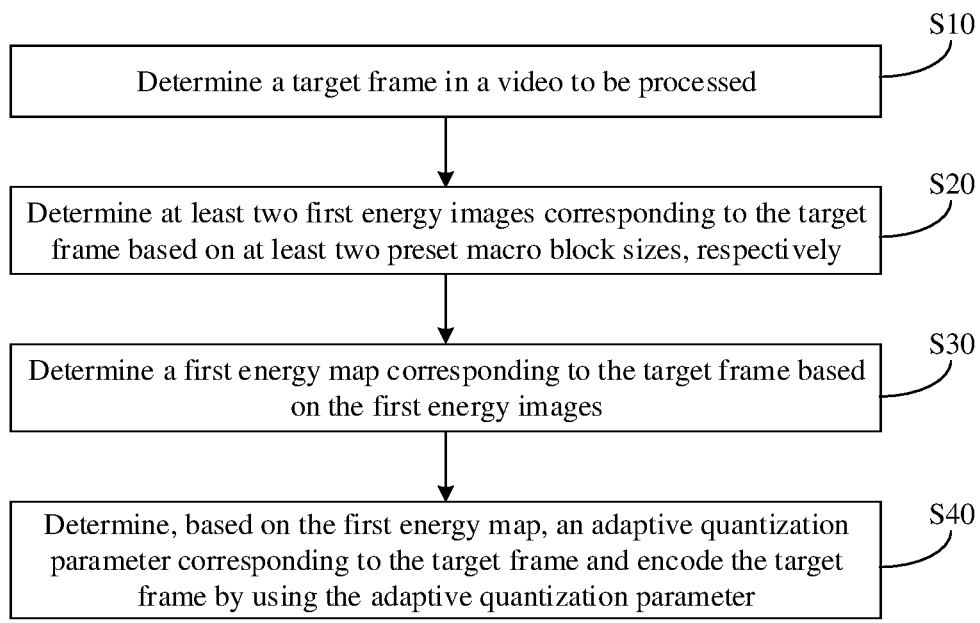
FIG. 1 illustrates a flowchart of a method for video processing provided by an embodiment of the present disclosure.

Various exemplary embodiments, features, and aspects of the present disclosure will be described in detail below with reference to the drawings. The same reference numerals in the drawings indicate elements with the same or similar functions. Although various aspects of the embodiments are illustrated in the drawings, unless otherwise noted, the drawings are not necessarily drawn to scale.

The dedicated word "exemplary" herein means "serving as an example, embodiment, or illustration". Any embodiment described herein as "exemplary" need not to be construed as being superior or better than other embodiments.

The term "and/or" herein is only an association relationship describing associated objects, which means that there can be three relationships. For example "A and/or B" can represent that A exists alone, A and B exist at the same time and B exists alone. In addition, the term "at least one" herein means any one of the multiple or any combination of at least two of the multiple. For example, including at least one of A, B or C, can mean including any one or more elements selected from a set formed by A, B and C.

In addition, in order to better illustrate the present disclosure, numerous specific details are given in the following specific implementations. Those skilled in the art should understand that without certain specific details, the present disclosure can also be implemented. In some examples, the methods, means, elements, and circuits well-known to those skilled in the art have not been described in detail in order to highlight the gist of the present disclosure.

FIG. 1 illustrates a flowchart of a method for video processing provided by an embodiment of the present disclosure. The method for video processing may be performed by a terminal device or other processing devices. The terminal device can be user equipment (UE), a mobile device, a user terminal, a terminal, a cellular phone, a cordless phone, a personal digital assistant (PDA), a handheld device, a computing device, a vehicle-mounted device, a wearable device or the like. In some possible implementations, the method for video processing can be implemented by a processor through invoking computer readable instructions stored in a memory.

In an exemplary application scenario, the method for video processing according to the embodiment of the present disclosure can be performed on a predetermined video to be processed and multiple preset macro block sizes, to determine a respective adaptive quantization parameter corresponding to each of frames in the video to be processed, and perform video encoding based on the frames in the video to be processed and the respective adaptive quantization parameter corresponding to each frame. In some embodiments, the method for video processing and the video encoding in the embodiment of the present disclosure can be implemented by the same device, or the method for video processing is performed by the terminal device or other devices and then the processed video is transmitted to a video encoder for video encoding.

As illustrated in FIG. 1, in an exemplary embodiment, the method for video processing according to an embodiment of the present disclosure includes the following operations S10 to S40.

At an operation S10, a target frame is determined in a video to be processed.

In a possible implementation, according to the embodiment of the present disclosure, the method for video processing is performed by performing processing on each of frames in the video to be processed separately. That is, each frame in the video to be processed can be taken as the target frame for image processing, so as to determine an adaptive quantization parameter corresponding to the frame. After completing the image processing of a current target frame, an unprocessed frame in the video to be processed is re-determined as a new target frame until the image processing of all the frames in the video to be processed is completed, so as to complete the process of video processing of the video to be processed. In some embodiments, in order to improve video processing efficiency, a processing order of target frames may be determined in sequence based on a timeline order.

For example, when the video to be processed includes T1 to T10 frames, T1, T2, T3, T4, T5, T6, T7, T8, T9 and T10 are sequentially determined as the target frames based on the timeline order, so as to determine a respective adaptive quantization parameter corresponding to each target frame. In some embodiments, after determining the adaptive quantization parameter corresponding to the current target frame, the current target frame is input into a video encoder as an input frame, and the corresponding adaptive quantization parameter is input into an adaptive quantization interface of the video encoder for video encoding. At the same time, the next frame in the timeline order is re-determined as the target frame.

At an operation S20, at least two first energy images corresponding to the target frame are determined based on at least two preset macro block sizes, respectively.

In a possible implementation, multiple preset macro block sizes are determined, and then multiple first energy images corresponding to the target frame are determined based on the multiple preset macro block sizes, respectively. Each first energy image includes alternating current energy of multiple first macro blocks with the same size, herein, the multiple first macro blocks are obtained by segmenting the target frame based on a respective one of the macro block sizes. That is, each first energy image represents alternating current energy of the multiple first macro blocks obtained after segmenting the target frame based on the respective macro block size. Respective alternating current energy corresponding to each first macro block represents an image texture complexity in the first macro block. For a first macro block with a flat image, the alternating current energy obtained through calculation is small, while for a first macro block with a complex image texture, the alternating current energy obtained through calculation is large.

In some embodiments, the macro block sizes are set based on a fixed ratio. That is, the macro block sizes form a preset geometric sequence. In some embodiments, a process of determining the macro bloc sizes is as follows. A target size is set at first. The target size is reduced for multiple times and enlarged for multiple times based on a fixed ratio, so as to obtain multiple corresponding reduced sizes and enlarged sizes. The target size, the reduced sizes and enlarged sizes are all taken as the preset macro block sizes, and the preset macro block sizes are applied to the method for video processing according to the embodiment of the present disclosure. For example, when a preset target size is N (N is a positive number) and a fixed ratio is 2, the corresponding two reduced sizes N/2 and N/4 and the corresponding two enlarged sizes 2N and 4N can be obtained by reducing the target size twice and enlarging the target size twice, respectively, and the five macro block sizes can be determined as N/4, N/2, N, 2N and 4N in sequence.

Figure 2:
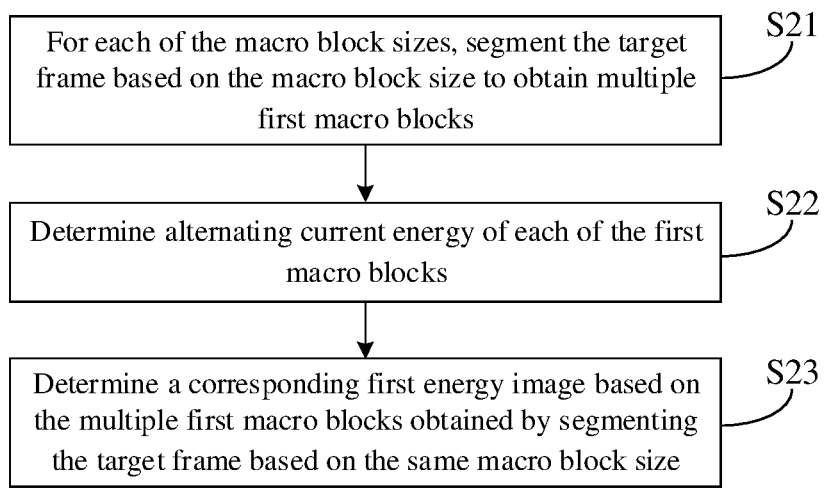
FIG. 2 illustrates a flowchart of a process for determining first energy images provided by an embodiment of the present disclosure.

FIG. 2 illustrates a flowchart of a process for determining first energy images provided by an embodiment of the present disclosure. As illustrated in FIG. 2, in a possible implementation, the at least two first energy images corresponding to the target frame are determined based on the at least two preset macro block sizes, respectively, which includes the following operations S21 to S23.

At an operation S21, for each of the macro block sizes, the target frame is segmented based on the macro block size to obtain multiple first macro blocks.

In a possible implementation, the target frame is segmented based on each of multiple macro block sizes set in a fixed ratio, so as to obtain multiple first macro blocks corresponding to the macro block size. In some embodiments, a format of the target frame may be an RGB format or a YUV format, which is not limited herein. In some embodiments, when the format of the target frame is the YUV format, the format of the target frame may be YUV444, YUV422, YUV420, or YUV411. The process of segmenting the target frame can be determined based on the format. For example, when the format of the target frame is the YUV422, multiple pixel values for three channels Y, U and V are obtained in a ratio of 2:1:1, so as to determine corresponding first macro blocks.

Herein, when the target frame is segmented based on each macro block size, multiple first macro blocks corresponding to the macro block size can be obtained. For example, when a size of the target frame is 32×32, and the macro block sizes are 2×2, 4×4, 8×8, 16×16 and 32×32, respectively, the target frame is segmented based on each macro block size, to obtain 256 first macro blocks with a size of 2×2, 64 first macro blocks with a size of 4×4, 16 first macro blocks with a size of 8×8, 4 first macro blocks with a size of 16×16, and 1 first macro block with a size of 32×32.

Figure 3:
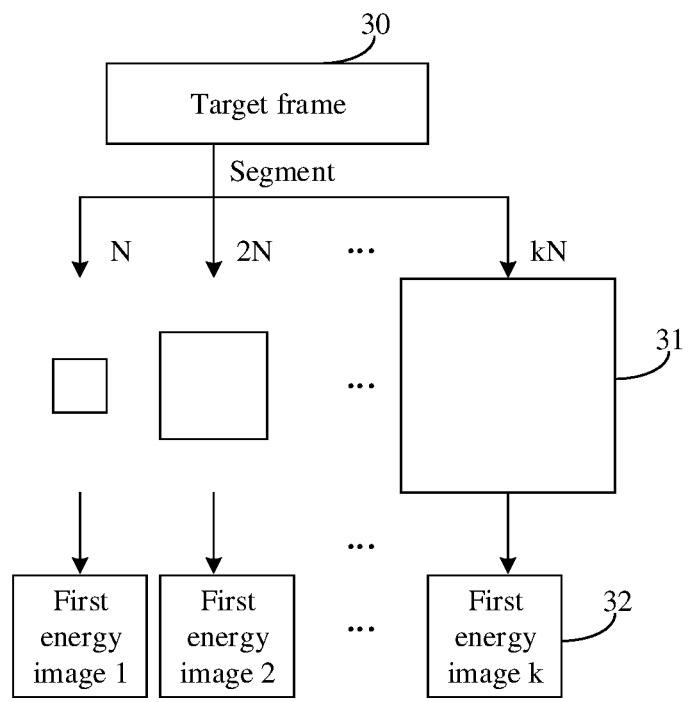
FIG. 3 illustrates a diagram of a process for determining first energy images provided by an embodiment of the present disclosure.

FIG. 3 illustrates a diagram of a process for determining first energy images provided by an embodiment of the present disclosure. As illustrated in FIG. 3, after a target frame 30 is determined, the target frame 30 is segmented based on each of multiple preset macro block sizes N, 2N, . . . , kN with a fixed ratio of 2, to obtain multiple first macro blocks 31 with different sizes, so as to determine a respective one of first energy images 32 corresponding to each macro block size based on multiple first macro blocks with a same size.

At an operation S22, alternating current energy of each of the first macro blocks is determined.

In a possible implementation, alternating current energy of each of first macro blocks is calculated, where the first macro blocks include first macro blocks with the same size and first macro blocks with different sizes. That is, alternating current energy of all the first macro blocks obtained after segmentation based on the macro block sizes can be determined. The alternating current energy represents an energy characteristic of each pixel in the corresponding first macro block.

In some embodiments, according to the embodiments of the present disclosure, the alternating current energy corresponding to the first macro block is determined based on variance of all pixel values and the number of pixels in the first macro block. In some embodiments, the variance of all the pixel values in the first macro block is calculated at first, and then the variance is divided by the number of pixels in the first macro block to obtain the alternating current energy corresponding to the first macro block.

Figure 4:
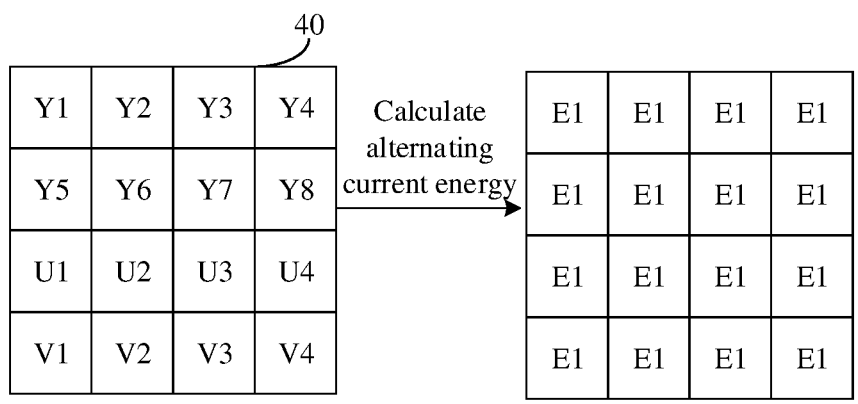
FIG. 4 illustrates a diagram of determining alternating current energy provided by an embodiment of the present disclosure.

FIG. 4 illustrates a diagram of determining alternating current energy provided by an embodiment of the present disclosure. As illustrated in FIG. 4, variance of pixel values Y1-Y8, U1-U4 and V1-V4 in a first macro block 40 obtained after segmentation is calculated, and then the variance is divided by the total number of pixels (i.e., 16) in the first macro block 40 to obtain corresponding alternating current energy E1. In some embodiments, after the alternating current energy E1 of the first macro block 40 is obtained through calculation, the alternating current energy E1 may be filled into each pixel position in the first macro block 40 as a pixel value.

It will be understood by those skilled in the art that the method of calculating the alternating current energy is not limited to the above examples as long as the energy characteristic of each pixel in the first macro block can be represented.

At an operation S23, a corresponding first energy image is determined based on the multiple first macro blocks obtained by segmenting the target frame based on the same macro block size.

In a possible implementation, the multiple first macro blocks obtained by segmenting the target frame based on the same macro block size are of the same size, namely, the first energy image is determined based on the multiple first macro blocks with the same size and the alternating current energy of each first macro block. Herein, pixel values at pixel positions in the first energy image are the respective alternating current energy of the first macro blocks. That is, a respective one of the first energy images corresponding to each macro block size is determined, and a size of each first energy image is the same as a size of the target frame. For multiple first macro blocks with the same size, the respective alternating current energy of these first macro blocks is filled into corresponding pixel positions in the corresponding first energy image, where the corresponding pixel positions are positions of pixels of the first macro blocks in the target frame before being segmented.

In some embodiments, the method for determining the first energy image can be as follows. At first, the alternating current energy of each first macro block is filled into each pixel position in the first macro block as a pixel value. Then, pixel values in the multiple first macro blocks with the same size are filled into the corresponding pixel positions in the corresponding first energy image to obtain the first energy image, or the multiple first macro blocks filled with respective alternating current energy as the pixel values are spliced based on positions of the multiple first macro blocks before being segmented to obtain the first energy image.

In some embodiments, due to different sizes of the first macro blocks used for determining the first energy images, multiple first energy images corresponding to the target frame can be superimposed together to form an energy pyramid for representing energy distribution in the corresponding target frame.

At an operation S30, a first energy map corresponding to the target frame is determined based on the first energy images.

In a possible implementation, the first energy map represents the energy distribution in the target frame. The process of determining the first energy map corresponding to the target frame may include the following operations. A first mean value of the multiple first energy images at a same pixel position is determined. The first energy map is determined based on first mean values corresponding to all pixel positions. When it is determined that the target frame corresponds to the multiple first energy images, the multiple first energy images are superimposed and fused, so as to calculate a first mean value of pixel values of the multiple first energy images at the same pixel position as a pixel value of the first energy map at the pixel position. That is, the multiple first energy images are taken as multiple channels respectively, and the first energy map is obtained by a fusion manner of channel average.

For example, a target frame corresponds to two first energy images, where a first energy image 1 represents respective alternating current energy of 4 first macro blocks each having a size of 2*2, and a first energy image 2 represents respective alternating current energy of 16 first macro blocks each having a size of 1*1. For example, pixel values corresponding to pixel positions in the first energy image 1 are shown as follows.

$$\begin{bmatrix} \begin{bmatrix} E1 & E1 \\ E1 & E1 \end{bmatrix} & \begin{bmatrix} E2 & E2 \\ E2 & E2 \end{bmatrix} \\ \begin{bmatrix} E3 & E3 \\ E3 & E3 \end{bmatrix} & \begin{bmatrix} E4 & E4 \\ E4 & E4 \end{bmatrix} \end{bmatrix}$$

Herein, E1, E2, E3 and E4 represents respective alternating current energy of 4 first macro blocks, respectively.

Moreover, pixel values corresponding to pixel positions in the first energy image 2 are shown as follows.

$$\begin{bmatrix} E5 & E6 & E7 & E8 \\ E9 & E10 & E11 & E12 \\ E13 & E14 & E15 & E16 \\ E17 & E18 & E19 & E20 \end{bmatrix}$$

Herein, the 16 pixel values represent respective alternating current energy of 16 first macro blocks, respectively. In this case, the first energy image 1 and the first energy image 2 are used as two channels for channel average. That is, a mean value of pixel values of the first energy image 1 and the first energy image 2 at the same pixel position is calculated to obtain the first energy map. The pixel values in the first energy map are as follows.

$$\begin{bmatrix} \frac{E1+E5}{2} & \frac{E1+E6}{2} & \frac{E2+E7}{2} & \frac{E2+E8}{2} \\ \frac{E1+E9}{2} & \frac{E1+E10}{2} & \frac{E2+E11}{2} & \frac{E2+E12}{2} \\ \frac{E3+E13}{2} & \frac{E3+E14}{2} & \frac{E4+E15}{2} & \frac{E4+E16}{2} \\ \frac{E3+E17}{2} & \frac{E3+E18}{2} & \frac{E4+E19}{2} & \frac{E4+E20}{2} \end{bmatrix}.$$

Figure 5:
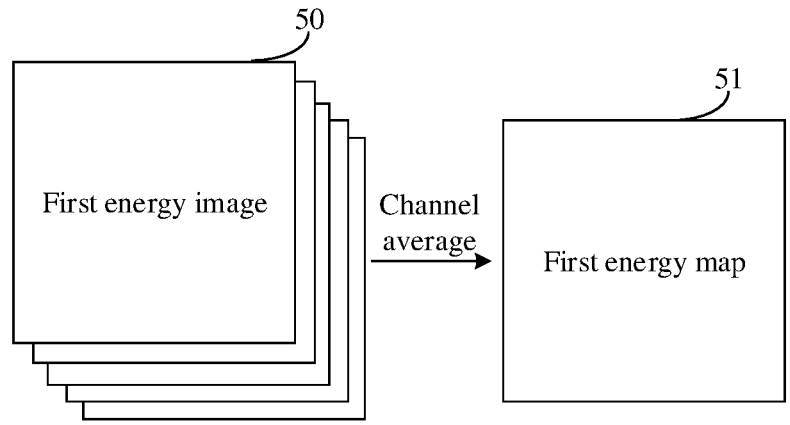
FIG. 5 illustrates a diagram of determining a first energy map provided by an embodiment of the present disclosure.

FIG. 5 illustrates a diagram of determining a first energy map provided by an embodiment of the present disclosure. As illustrated in FIG. 5, in a possible implementation, according to the embodiment of the present disclosure, a first energy pyramid 50 formed by multiple first energy images corresponding to a target frame is determined, and channel average is performed on the first energy pyramid 50 to obtain a first energy map 51 for representing the energy distribution in the target frame.

According to the embodiment of the present disclosure, a target frame can be segmented by using each of different macro block sizes for energy estimation, and a first energy map representing energy distribution of the target frame is determined based on multiple first energy images obtained through the estimation, so as to adapt to the multi-resolution video quantization process in the subsequent video encoding.

At an operation S40, an adaptive quantization parameter corresponding to the target frame is determined based on the first energy map and the target frame is encoded by using the adaptive quantization parameter.

In a possible implementation, the adaptive quantization parameter corresponding to the target frame can be determined based on the first energy map representing the energy distribution of the target frame, for adaptively quantizing the target frame in the video encoding process to improve the video encoding effect. In some embodiments, the process of determining the adaptive quantization parameter corresponding to the target frame may include the following operations. A second energy map corresponding to the first energy map is determined by means of average pooling. The adaptive quantization parameter corresponding to the target frame is determined based on the second energy map, and the target frame is encoded by using the adaptive quantization parameter.

In some embodiments, the purpose of performing the average pooling on the first energy map is to reduce the size of the first energy map to obtain the second energy map with less resolution as a candidate adaptive quantization parameter. In a possible implementation, the process of the average pooling includes the following operations. A target macro block size is determined; and by taking the target macro block size as a window and a stride, the average pooling is performed on the first energy map to obtain the second energy map. The target macro block size can be determined based on the multiple preset macro block sizes. That is, the target macro block size can be one of the multiple preset macro block sizes, or the target macro block size can be obtained by scaling one of the multiple preset macro block sizes. That is, the second energy map is a map obtained by scaling the first energy map based on the target macro block size. The process of the average pooling reduces the resolution while retaining each energy characteristic in the first energy map, thereby improving the efficiency of the subsequent video encoding process.

In some embodiments, in order to improve the efficiency of the video encoding process, the target macro block size may be a median value among all macro block sizes. For example, when the macro block sizes are N/4, N/2, N, 2N and 4N, the target macro block size is determined to be N. After determining the target macro block size as N, the average pooling is performed on the first energy map by taking a size of N*N as a window and taking N as a stride to obtain the second energy map. Herein, a product of resolution of the second energy map and N is resolution of the first energy map. That is, the second energy map is an image with smaller resolution for reflecting energy characteristics of the target frame.

In a possible implementation, after obtaining the second energy map, the adaptive quantization parameter corresponding to the target frame is determined by means of histogram mapping. In some embodiments, a histogram mapping table corresponding to the second energy map is determined. The second energy map is mapped based on the histogram mapping table to obtain the adaptive quantization parameter corresponding to the target frame. The adaptive quantization parameter and the target frame are input into a video encoder for performing video encoding on the target frame based on the corresponding adaptive quantization parameter. In some embodiments, the mapping process includes the following operations. A blank image with the same size as the second energy map is initialized. For each pixel value in the second energy map, a respective value in the histogram mapping table is determined and the respective value is stored at a position, which is the same as a position of the pixel value, in the blank image, so as to obtain the corresponding adaptive quantization parameter; or, for each pixel value in the second energy map, a respective value of the pixel value in the histogram mapping table is determined, and the pixel value in the second energy map is replaced with the respective value to obtain the adaptive quantization parameter.

Figure 6:
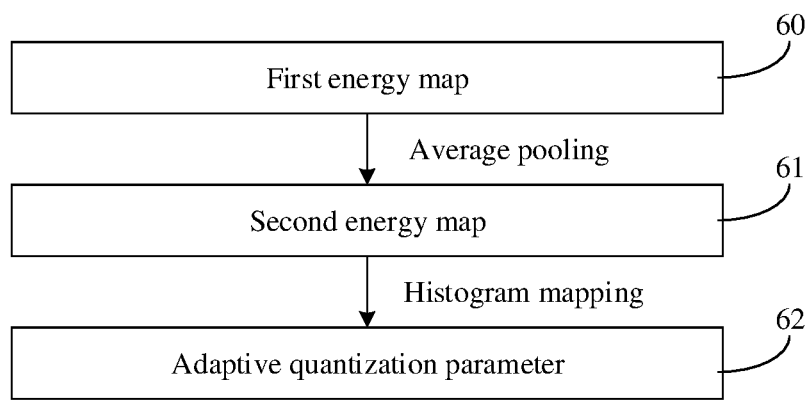
FIG. 6 illustrates a diagram of a process for determining an adaptive quantization parameter provided by an embodiment of the present disclosure.

FIG. 6 illustrates a diagram of a process for determining an adaptive quantization parameter provided by an embodiment of the present disclosure. As illustrated in FIG. 6, in an application scenario of video encoding, according to the embodiment of the present disclosure, after determining a first energy map 60, a second energy map 61 corresponding to the target frame is obtained by means of average pooling. In some embodiments, an adaptive quantization parameter 62 is obtained by performing a histogram mapping on the second energy map 61. Herein, the process of the histogram mapping includes following operations. Histogram statistics are performed on the second energy map 61 to obtain a corresponding histogram mapping table, and then the second energy map 61 are mapped based on the histogram mapping table to obtain the adaptive quantization parameter 62.

Figure 7:
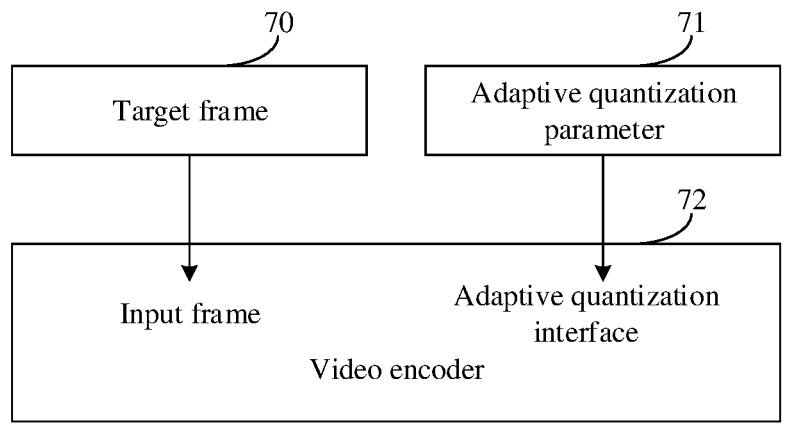
FIG. 7 illustrates a diagram of a data transmission process provided by an embodiment of the present disclosure.

FIG. 7 illustrates a diagram of a data transmission process provided by an embodiment of the present disclosure. As illustrated in FIG. 7, after obtaining the first energy map for representing the energy characteristics of the target frame, the target frame 70 is input into a video encoder 72 as an input frame for the video encoder. At the same time, an adaptive quantization parameter 71 determined based on the first energy map is also input into an adaptive quantization interface of the video encoder 72 as a parameter for performing video encoding on the target frame 70.

In a video encoding scenario, according to the embodiment of the present disclosure, the corresponding adaptive quantization parameter is determined based on energy distribution characteristics of the target frame, so as to perform adaptive quantization adjustment, which improves the efficiency of the video encoding process.

According to the embodiment of the present disclosure, a target frame is segmented based on different macro block sizes, respective alternating current energy of the target frame after being segmented based on each macro block size is calculated, a first energy map is determined based on first energy images each including the respective alternating current energy, and an adaptive quantization parameter corresponding to the target frame is determined based on the first energy map, so that the adaptive quantization parameter is associated with energy characteristics of the target frame after being segmented based on multiple macro block sizes, and when the adaptive quantization parameter is applied to the encoding of the target frame, video encoding can be performed based on macro blocks of different sizes to adapt to complex scenarios with large resolution changes during the video encoding.

Figure 8:
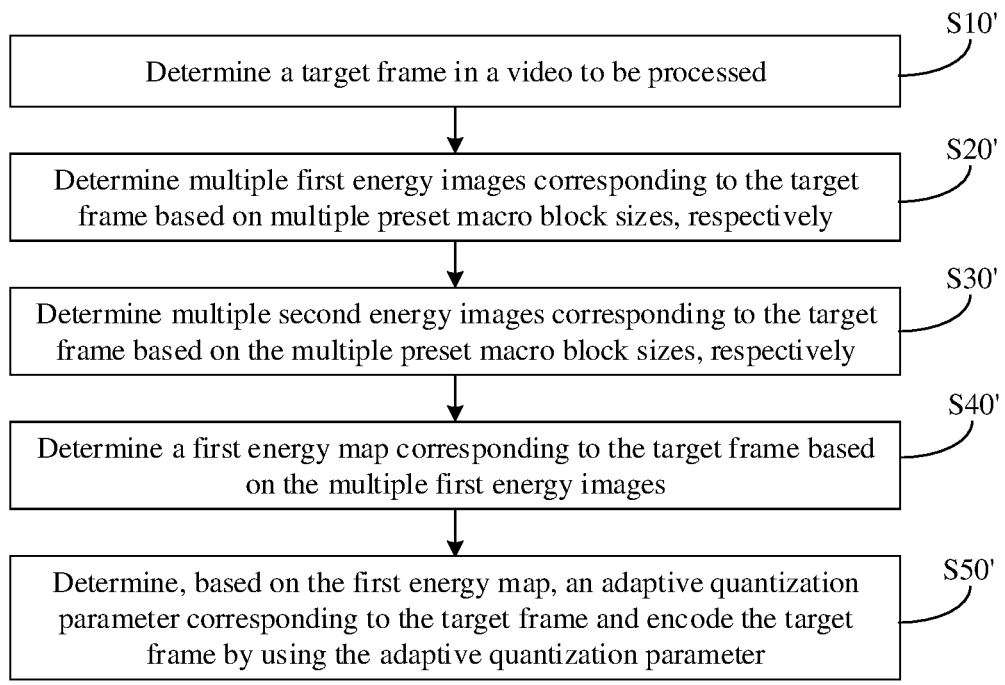
FIG. 8 illustrates a flowchart of a method for video processing provided by an embodiment of the present disclosure.

FIG. 8 illustrates a flowchart of a method for video processing provided by an embodiment of the present disclosure. The flowchart represents the implementation process of another method for video processing according to an embodiment of the present disclosure. As illustrated in FIG. 8, in an exemplary embodiment, the method for video processing according to an embodiment of the present disclosure includes the following operations S10' to S50'.

At an operation S10', a target frame is determined in a video to be processed.

In a possible implementation, the process of determining the target frame in the operation S10' is similar to the operation S10.

At an operation S20', multiple first energy images corresponding to the target frame are determined based on multiple preset macro block sizes, respectively.

In a possible implementation, the process of determining the first energy images in the operation S20' is similar to the operation S20.

At an operation S30', multiple second energy images corresponding to the target frame are determined based on the multiple preset macro block sizes, respectively.

In a possible implementation, while determining multiple first energy images corresponding to the target frame, corresponding multiple second energy images are determined based on the multiple macro block sizes, respectively, and multiple macro block sizes used for determining the first energy images are same as multiple macro block sizes used for determining the second energy images. In some embodiments, each second energy image includes respective alternating current energy of multiple second macro blocks with the same size, herein, the second macro blocks are obtained by shifting and segmenting the target frame based on a respective one of the macro block sizes.

Figure 9:
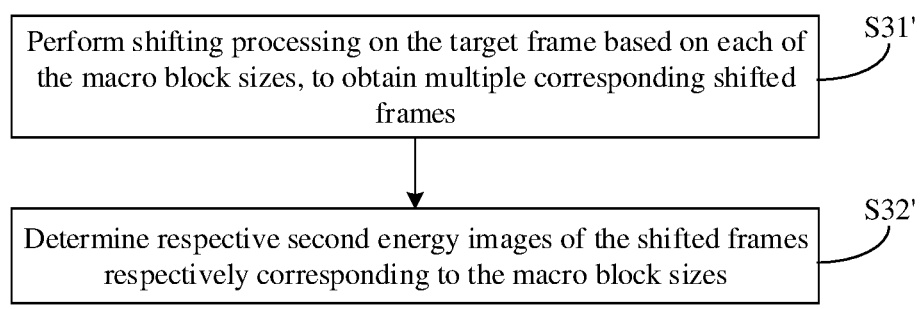
FIG. 9 illustrates a flowchart of a process for determining second energy images provided by an embodiment of the present disclosure.

FIG. 9 illustrates a flowchart of a process for determining second energy images provided by an embodiment of the present disclosure. As illustrated in FIG. 9, according to an embodiment of the present disclosure, the process of determining the multiple second energy images corresponding to the target frame may include the following operations S31' to S32'.

At an operation S31', shifting processing is performed on the target frame based on each of the macro block sizes, to obtain multiple corresponding shifted frames.

In some embodiments, the process of determining the multiple second energy images corresponding to the target frame may include that performing, based on each of the macro block sizes, shifting processing on the target frame, to obtain the multiple corresponding shifted frames; and determining respective second energy images of the shifted frames respectively corresponding to the macro block sizes. That is, the shifting processing is performed on the target frame based on each of the macro block sizes, and then a second energy image corresponding to the target frame subjected to the shifting processing based on the macro block size serving as a current macro block size is determined based on the macro block size. For example, when the target frame is shifted by a macro block size 1, a macro block size 2, and a macro block size 3 to obtain a shifted frame 1, a shifted frame 2, and a shifted frame 3, respectively, a second energy image corresponding to the shifted frame 1 is determined based on the macro block size 1, a second energy image corresponding to the shifted frame 2 is determined based on the macro block size 2, and a second energy image corresponding to the shifted frame 3 is determined based on the macro block size 3.

In a possible implementation, the process of determining the shifted frames respectively corresponding to the macro block sizes includes the following operations. Each of the macro block sizes is scaled based on a preset scaling ratio, to obtain corresponding shifting sizes. Based on each of the shifting sizes, shifting processing is performed on the target frame to obtain the multiple corresponding shifted frames. In other words, each macro block size is scaled at a preset scaling ratio, and then the target frame is shifted based on the scaled shifting size to obtain a respective shifted frame. That is, the respective shifted frame is obtained by shifting each target frame based on a respective shifting size. For example, when the macro block sizes are N/4, N/2, N, 2N, and 4N, respectively and the preset scaling ratio is 1/2, the shifting sizes are determined to be N/8, N/4, N/2, N, and 2N, respectively, so that the target frame is shifted by a length of N/8, a length of N/4, a length of N/2, a length of N, and a length of 2N in a preset shifting direction.

In some embodiments, a shifting direction of shifting the target frame by each of the shifting sizes is the same. The shifting direction can be any diagonal direction. For example, the target frame is shifted along a diagonal direction to an upper left corner, a lower right corner, a lower left corner, or an upper right corner.

In a possible implementation, the method of performing the shifting processing on the target frame based on each shifting size includes the following operations. For each of the shifting sizes, a quantity of pixel rows and pixel columns are added at two adjacent sides of the target frame respectively by copying the two adjacent sides, the quantity of the added pixel rows and pixel columns corresponds to the shifting size, and a pixel at an intersection position of the two adjacent sides is copied to a blank area between the added pixel rows and the pixel columns, to obtain a corresponding candidate shifted frame. A quantity of pixel rows and pixel columns at two sides not being copied of the candidate shifted frame are cropped to obtain a corresponding shifted frame, and the quantity of the cropped pixel rows and pixel columns corresponds to the shifting size.

For example, the preset shifting direction is a diagonal direction to a lower right corner. When a shifting size is N, pixels in a left column of the target frame are copied to a left side N times, pixels in a top row of the target frame are copied to an up side N times, and a pixel in an upper left corner of the target frame is copied to the upper left corner (i.e., blank positions between the copied pixel rows and pixel columns) N*N times to obtain a candidate shifted frame whose length increases by N compared to the target frame. Then, N pixel rows at a bottom of the candidate shifted frame are cropped and N pixel columns at a right side of the candidate shifted frame are cropped to obtain a shifted frame. Through the above processing, the target frame image is shifted by N rows and N columns to the lower right corner, overflow rows and columns are cropped and the upper left corner is filled.

In some embodiments, the method of shifting is not limited to the above examples. For example, 2 columns (2 rows) or more than 2 columns (more than 2 rows) may be copied simultaneously.

At an operation S32', respective second energy images of the shifted frames respectively corresponding to the macro block sizes are determined.

In a possible implementation, based on each macro block size, a second energy image of a shifted frame corresponding to the macro block size as a current macro block size is determined. The process of determining the second energy image is similar to the process of determining the first energy image, and may include the following operations. For each of the macro block sizes, a shifted frame corresponding to the macro block size is segmented based on the macro block size to obtain multiple second macro blocks; alternating current energy of each of the second macro blocks is determined; and a corresponding second energy image is determined based on the multiple second macro blocks corresponding to the same shifted frame, where pixel values in the corresponding second energy image are respective alternating current energy of the multiple second macro blocks.

In some embodiments, the process of segmenting the shifted frame based on the macro block size, determining the respective alternating current energy of the second macro blocks, and determining the second energy image based on the respective alternating current energy is similar to the process of determining the first energy image.

In some embodiments, due to that sizes of second macro blocks used for determining second energy images are different, multiple second energy images corresponding to the target frame are superimposed together to form another energy pyramid for representing energy distribution in the corresponding target frame. Therefore, two different energy pyramids corresponding to the target frame can be obtained.

Figure 10:
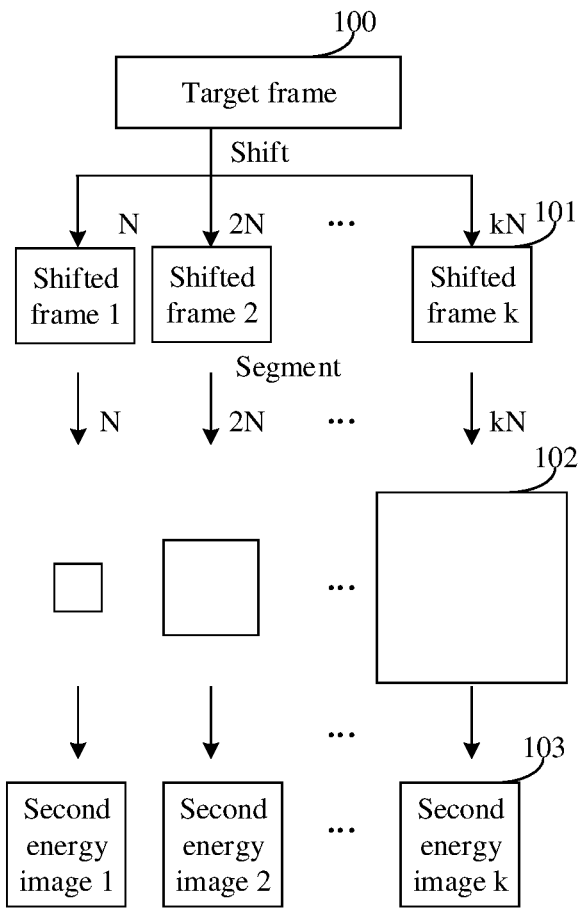
FIG. 10 illustrates a diagram of a process for determining second energy images provided by an embodiment of the present disclosure.

FIG. 10 illustrates a diagram of a process for determining second energy images provided by an embodiment of the present disclosure. As illustrated in FIG. 10, according to the embodiment of the present disclosure, after determining a target frame 100, the target frame is shifted based on different macro block sizes to obtain multiple shifted frames 101, and then each of the multiple shifted frames 101 is segmented based on a respective one of the macro block sizes to determine multiple second macro blocks 102. In some embodiments, a respective second energy image 103 is determined based on the multiple second macro blocks 102 obtained after each of the multiple shifted frames 101 is segmented.

Figure 11:
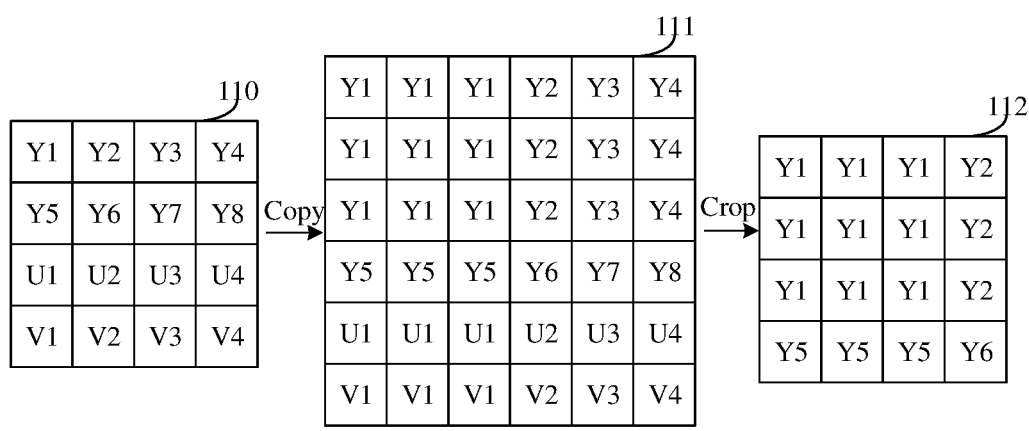
FIG. 11 illustrates a diagram of a process for determining a shifted frame provided by an embodiment of the present disclosure.

FIG. 11 illustrates a diagram of a process for determining a shifted frame provided by an embodiment of the present disclosure. For example, a shifting size is 2 and a size of a target frame 110 is 4*4. As illustrated in FIG. 11, in a possible implementation, when a preset shifting direction for the target frame 110 is a diagonal direction along a lower right corner, a first top row in the target frame 110 is copied to an up side twice and a first left column in the target frame 110 is copied to a left side twice, and a first pixel in an upper left corner of the target frame is copied four times at unconnected positions of rows and columns obtained through copying, so as to obtain a candidate shifted frame 111 with a size of 6*6. In some embodiments, the right two columns and the bottom two rows of the candidate shifted frame 111 are cropped, so as to obtain a shifted frame with a size of 4*4 which is the same as the size of the target frame 110.

According to the embodiment of the present disclosure, a target frame is shifted through a sliding window with low complexity, and based on respective alternating current energy of all parts of the target frame after being shifted, an energy pyramid representing energy situation of the target frame after being shifted by different sizes is obtained, thereby improving the robustness of energy estimation and reducing blocking artifacts caused by the bit rate mutation between macro blocks in the subsequent video encoding process.

At an operation S40', a first energy map corresponding to the target frame is determined based on the first energy images.

In a possible implementation, the first energy map is jointly determined based on the multiple first energy images and the multiple second energy images. That is, a second mean value of the multiple first energy images and the multiple second energy images at a same pixel position is determined, and the first energy map is determined based on second mean values corresponding to all pixel positions. After determining the multiple first energy images and the multiple second energy images corresponding to the target frame, the multiple first energy images and the multiple second energy images are superimposed and fused, so as to calculate the second mean value of pixel values of the multiple first energy images and the multiple second energy images at the same pixel position as a pixel value of the first energy map at the pixel position. That is, the multiple first energy images are taken as multiple channels and the multiple second energy images are taken as multiple channels, and the first energy map is obtained by a fusion manner of channel average.

Figure 12:
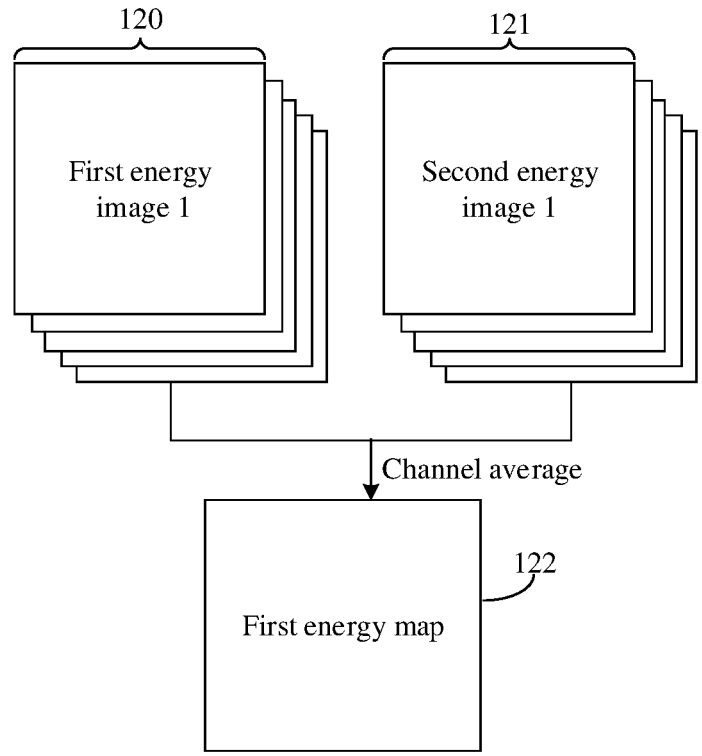
FIG. 12 illustrates a diagram of determining a first energy map provided by an embodiment of the present disclosure.

FIG. 12 illustrates a diagram of determining a first energy map provided by an embodiment of the present disclosure. As illustrated in FIG. 12, in a possible implementation, according to the embodiment of the present disclosure, a first energy pyramid 120 formed by multiple first energy images corresponding to a target frame, and a second energy pyramid 121 formed by multiple second energy images corresponding to the target frame are determined. The energy images in the first energy pyramid 120 and the second energy pyramid 121 are used as channels for performing channel average to obtain a first energy map 122 for representing energy distribution in the target frame.

According to the embodiment of the present disclosure, a target frame is segmented based on different macro block sizes for energy estimation, and a first energy map representing energy distribution in the target frame is determined based on multiple first energy images obtained after estimation. At the same time, the target frame is shifted and segmented based on different macro block sizes for energy estimation, and a second energy map representing the energy distribution in the target frame is determined based on multiple second energy images obtained after estimation. A first energy map determined based on the multiple first energy images and the multiple second energy images can adapt to the multi-resolution video quantization process in the subsequent video encoding, the robustness of energy estimation is improved and blocking artifacts caused by the bit rate mutation between macro blocks in the subsequent video encoding process are reduced.

At an operation S50', an adaptive quantization parameter corresponding to the target frame is determined based on the first energy map, and the target frame is encoded by using the adaptive quantization parameter.

In a possible implementation, the process of determining the adaptive quantization parameter in the operation S50' is similar to the operation S40.

According to the embodiment of the present disclosure, respective alternating current energy of all parts of an original image in a target frame is determined based on each of multiple macro block sizes, and respective alternating current energy of all parts after being shifted by different sizes is determined; an energy map is determined based on an energy pyramid for representing the alternating current energy after the original image is segmented by using different macro block sizes and an energy pyramid for representing the alternating current energy after the original image is shifted and segmented by using different macro block sizes; and a corresponding adaptive quantization parameter is generated, so that the adaptive quantization parameter is associated with energy characteristics of the target frame after being segmented by using multiple macro block sizes and is associated with energy characteristics of the target frame after being shifted and segmented by using multiple macro block sizes, and when the adaptive quantization parameter is applied to the encoding of the target frame, video encoding can be performed based on macro blocks with different sizes to adapt to complex scenarios with large resolution changes during video encoding. Meanwhile, the robustness of the algorithm is improved and blocking artifacts caused by the bit rate mutation between macro blocks in the video encoding process are reduced.

In an implementation process, multiple first energy images corresponding to a target frame can be determined based on multiple preset macro block sizes, respectively. For example, K copies of an input target frame can be made, and for each target frame, at least two first energy images corresponding to the target frame can be determined based on at least two macro block sizes, respectively. Herein, one target frame can correspond to one group of first energy images, and one group of first energy images includes multiple first energy images, where K is a positive integer. For example, for each of K target frames, the target frame is segmented based on each of the macro block sizes, so as to obtain K groups of first energy images. After obtaining K groups of first energy images, for each group of first energy images, a first energy pyramid (multi-scale energy pyramid) can be formed based on multiple first energy images in the group of first energy images, so that K first energy pyramids can be further obtained.

At the same time, shifting processing is performed on the target frame based on each of the macro block sizes to obtain multiple shifted frames, and respective second energy images of the shifted frames respectively corresponding to the macro block sizes are determined. For example, M copies of an input target frame can be made, the macro block sizes can be scaled based on a preset scaling ratio to obtain shifting sizes, and the target frames can be shifted in a preset shifting direction based on the shifting sizes to obtain M shifted frames, where M is a positive integer, and values of M and K can be the same or different, and can be set according to needs. After obtaining the shifted frames, second energy images of the shifted frames respectively corresponding to the macro block sizes are determined, where one shifted frame corresponds to one group of second energy images, and one group of second energy images includes multiple second energy images. For example, for each of M shifted frames, the shifted frame is segmented based on each of the macro block sizes, so as to obtain M groups of second energy images. After obtaining M groups of second energy images, for each group of second energy images, a second energy pyramid (multi-scale sliding window energy pyramid) can be formed based on multiple second energy images in the group of the second energy images, so that M second energy pyramids can be further obtained.

Figure 13:
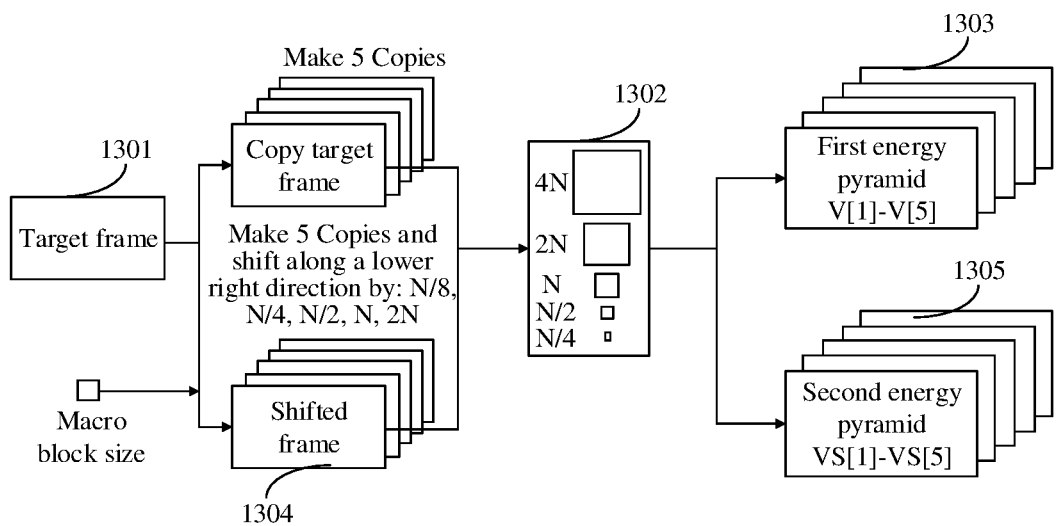
FIG. 13 illustrates a diagram of determining an energy pyramid provided by an embodiment of the present disclosure.

FIG. 13 illustrates a diagram of determining an energy pyramid provided by an embodiment of the present disclosure. As illustrated in FIG. 13, taking five copies of an input target frame 1301 being made as an example, in an implementation process, for each target frame, first energy images corresponding to the target frame can be determined based on macro block sizes 1302, respectively. When macro block sizes 1302 are N/4, N/2, N, 2N and 4N, respectively, for each of the five target frames, the target frame can be segmented based on each of the macro block sizes 1302, so as to obtain five groups of first energy images. After obtaining five groups of first energy images, for each group of first energy images, a first energy pyramid 1303 can be formed based on multiple first energy images in the group of first energy images, so that five first energy pyramids 1303 can be further obtained. The five first energy pyramids 1303 can be respectively represented as V[1], V[2], V[3], V[4] and V[5].

At the same time, five copies of the target frame 1301 can also be made. When the macro block sizes are N/4, N/2, N, 2N and 4N respectively, the macro block sizes can be scaled based on a preset scaling ratio to obtain shifting sizes. For example, the macro block sizes are reduced based on a ratio of 1/2, the obtained shifting sizes can be N/8, N/4, N/2, N and 2N. In an implementation process, N/8 columns of pixels and N/8 rows of pixels can be filled in the form of copy at a left edge and an upper edge of the target frame respectively and N/8 columns of pixels and N/8 rows of pixels can be cropped at a right edge and a lower edge of the target frame respectively, N/4 columns of pixels and N/4 rows of pixels can be filled in the form of copy at a left edge and an upper edge of the target frame respectively and N/4 columns of pixels and N/4 rows of pixels can be cropped at a right edge and a lower edge of the target frame respectively, N/2 columns of pixels and N/2 rows of pixels can be filled in the form of copy at a left edge and an upper edge of the target frame respectively and N/2 columns of pixels and N/2 rows of pixels can be cropped at a right edge and a lower edge of the target frame respectively, N columns of pixels and N rows of pixels can be filled in the form of copy at a left edge and an upper edge of the target frame respectively and N columns of pixels and N rows of pixels can be cropped at a right edge and a lower edge of the target frame respectively, 2N columns of pixels and 2N rows of pixels can be filled in the form of copy at a left edge and an upper edge of the target frame respectively and 2N columns of pixels and 2N rows of pixels can be cropped at a right edge and a lower edge of the target frame respectively, so as to obtain five shifted frames 1304 with the same size as the original target frame 1301. When the macro block sizes are N/4, N/2, N, 2N and 4N respectively, for each of the five shifted frames 1304, the shifted frame can be segmented based on each of the macro block sizes, to obtain five groups of second energy images. After obtaining the five groups of second energy images, for each group of second energy images, a second energy pyramid 1305 can be formed based on multiple second energy images in the group of the second energy images, so that five second energy pyramids 1305 can be further obtained. The five second energy pyramids 1305 can be respectively represented as VS[1], VS[2], VS[3], VS[4] and VS[5].

Figure 14:
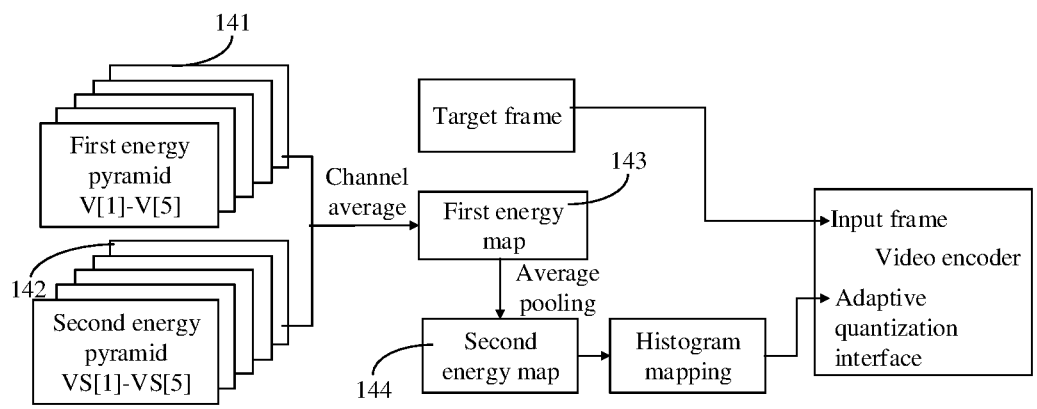
FIG. 14 illustrates a flowchart of video encoding provided by an embodiment of the present disclosure.

FIG. 14 illustrates a flowchart of video encoding provided by an embodiment of the present disclosure. As illustrated in FIG. 14, after obtaining a first energy pyramid 141 and a second energy pyramid 142, energy images in the first energy pyramid 141 and energy images in the second energy pyramid 142 may be taken as channels for performing channel average to obtain a first energy map 143 for representing energy distribution in the target frame. After obtaining the first energy map 143, a second energy map 144 corresponding to the first energy map 143 may be determined by means of average pooling. In some embodiments, the second energy map can also be called a macro block-level energy map. After obtaining the second energy map 144, an adaptive quantization parameter corresponding to the target frame can be determined by means of histogram mapping. After obtaining the adaptive quantization parameter, the adaptive quantization parameter is inputted into a video encoder through an adaptive quantization interface of the video encoder and the target frame is inputted into the video encoder at the same time, so that the target frame is encoded by the video encoder based on the adaptive quantization parameter.

According to the embodiment of the present disclosure, a target frame is shifted through a sliding window with low complexity, and based on respective alternating current energy of all parts of the target frame after being shifted, an energy pyramid for representing energy situation of the target frame after being shifted by different sizes is obtained, thereby improving the robustness of energy estimation and reducing blocking artifacts caused by the bit rate mutation between macro blocks in the subsequent video encoding process. It is to be understood that, without violating the principle and logic, the various method embodiments provided in the embodiments of the present disclosure can be combined with each other to form a combined embodiment, which will not be repeated in this disclosure due to space constraints. Those skilled in the art will appreciate that in the above-described methods of specific implementations, the specific execution order of each operation should be determined by its function and possible internal logic.

In addition, the present disclosure further provides an apparatus for video processing, an electronic device, a computer readable storage medium and a program, all of which can be used to implement any method for video processing provided by the present disclosure. The corresponding technical solutions and descriptions may refer to corresponding records of the method embodiments.

Figure 15:
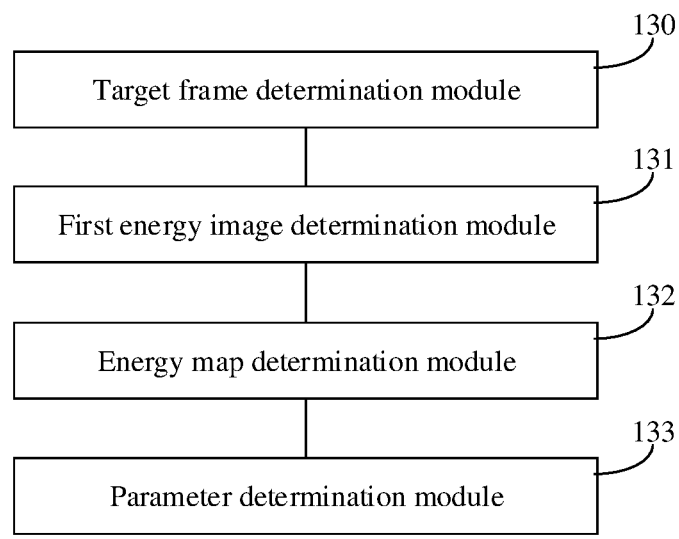
FIG. 15 illustrates a diagram of an apparatus for video processing provided by an embodiment of the present disclosure.

FIG. 15 illustrates a diagram of an apparatus for video processing provided by an embodiment of the present disclosure. As illustrated in FIG. 15, the apparatus includes a target frame determination module 130, a first energy image determination module 131, an energy map determination module 132 and a parameter determination module 133.

The target frame determination module 130 is configured to determine a target frame in a video to be processed.

The first energy image determination module 131 is configured to determine at least two first energy images corresponding to the target frame based on at least two preset macro block sizes, respectively. Herein, each of the first energy images represents alternating current energy of at least one first macro block corresponding to a respective one of the macro block sizes. Herein, the at least one first macro block is obtained by segmenting the target frame based on the respective macro block size.

The energy map determination module 132 is configured to determine a first energy map corresponding to the target frame based on the first energy images. Herein, the first energy map represents energy distribution in the target frame.

The parameter determination module 133 is configured to determine, based on the first energy map, an adaptive quantization parameter corresponding to the target frame and encode the target frame by using the adaptive quantization parameter.

In a possible implementation, the first energy image determination module includes a segmentation sub-module, an energy calculation sub-module and a first energy image determination sub-module. The segmentation sub-module is configured to: for each of the macro block sizes, segment the target frame based on the macro block size to obtain multiple first macro blocks. The energy calculation sub-module is configured to determine alternating current energy of each of the multiple first macro blocks. The first energy image determination sub-module is configured to determine a corresponding first energy image based on the multiple first macro blocks obtained by segmenting the target frame based on the same macro block size, where pixel values in the corresponding first energy image are respective alternating current energy of the multiple first macro blocks.

In a possible implementation, the energy computation sub-module includes a first calculation unit. The first calculation unit is configured to determine the alternating current energy corresponding to the first macro block based on variance of all pixel values and a number of pixels in the first macro block.

In a possible implementation, the energy map determination module includes a first mean value calculation sub-module and a first energy map determination sub-module. The first mean value calculation sub-module is configured to determine a first mean value of the first energy images at a same pixel position. The first energy map determination sub-module is configured to determine the first energy map based on first mean values corresponding to all pixel positions.

In a possible implementation, the apparatus further includes a second energy image determination module. The second energy image determination module is configured to determine at least two second energy images corresponding to the target frame based on the at least two preset macro block sizes, respectively. Herein, each of the second energy images representing alternating current energy of at least one second macro block corresponding to a respective one of the macro block sizes. Herein, the at least one second macro block is obtained by shifting and segmenting the target frame based on the respective macro block size. The energy map determination module includes a second mean value calculation sub-module and a second energy map determination sub-module. The second mean value calculation sub-module is configured to determine a second mean value of the first energy images and the second energy images at a same pixel position. The second energy map determination sub-module is configured to determine the first energy map based on second mean values corresponding to all pixel positions.

In a possible implementation, the second energy image determination module includes a shifting sub-module and a second energy image determination sub-module. The shifting sub-module is configured to perform, based on each of the macro block sizes, shifting processing on the target frame to obtain a plurality of shifted frames. The second energy image determination sub-module is configured to determine respective second energy images of the shifted frames respectively corresponding to the macro block sizes.

In a possible implementation, the shifting sub-module includes a first size determination unit and a shifting unit. The first size determination unit is configured to scale, based on a preset scaling ratio, the macro block sizes to obtain corresponding shifting sizes. The shifting unit is configured to perform, based on each of the shifting sizes, shifting processing on the target frame to obtain the plurality of shifted frames.

In a possible implementation, the shifting unit includes a copying sub-unit and a cropping sub-unit. The copying sub-unit is configured to: for each shifting size, add a quantity of pixel rows and pixel columns at two adjacent sides of the target frame respectively by copying the two adjacent sides, where the quantity of the added pixel rows and pixel columns corresponds to the shifting size, and copy a pixel at an intersection position of the two adjacent sides to a blank area between the added pixel rows and pixel columns, to obtain a corresponding candidate shifted frame. The cropping sub-unit is configured to crop a quantity of pixel rows and pixel columns at two sides not being copied of the candidate shifted frame to obtain a corresponding shifted frame, where the quantity of the cropped pixel rows and pixel columns corresponds to the shifting size.

In a possible implementation, the second energy image determination sub-module includes a segmentation unit, an energy calculation unit and an energy image determination unit. The segmentation unit is configured to segment, based on each of the macro block sizes, a shifted frame corresponding to the macro block size to obtain a plurality of second macro blocks. The energy calculation unit is configured to determine alternating current energy of each of the second macro blocks. The energy image determination unit is configured to determine a corresponding second energy image based on the multiple second macro blocks corresponding to the same shifted frame, where pixel values in the second energy image being respective alternating current energy of the plurality of second macro blocks.

In a possible implementation, the parameter determination module includes a pooling sub-module and a parameter determination sub-module. The pooling sub-module is configured to determine a second energy map corresponding to the first energy map by means of average pooling. The parameter determination sub-module is configured to determine, based on the second energy map, the adaptive quantization parameter corresponding to the target frame and encode the target frame by using the adaptive quantization parameters.

In a possible implementation, the pooling sub-module includes a second size determination unit and a pooling unit. The second size determination unit is configured to determine a target macro block size. The pooling unit is configured to perform, by taking the target macro block size as a window and a stride, the average pooling on the first energy map to obtain the second energy map.

In a possible implementation, the parameter determination sub-module includes a mapping table determination unit, a mapping unit and a data transmission unit. The mapping table determination unit is configured to determine a histogram mapping table corresponding to the second energy map. The mapping unit is configured to map the second energy map based on the histogram mapping table to obtain the adaptive quantization parameter corresponding to the target frame. The data transmission unit is configured to: input the adaptive quantization parameter and the target frame into a video encoder for performing, based on the corresponding adaptive quantization parameter, video encoding on the target frame.

In a possible implementation, the macro block sizes are set based on a fixed ratio.

In a possible implementation, the target frame determination module includes a target frame determination sub-module. The target frame determination sub-module is configured to determine the target frame from the video to be processed in sequence in a timeline order.

In some embodiments, the apparatus provided by the embodiment of the present disclosure has functions or includes modules that may be configured to perform the methods described above in the method embodiments, the implementation of which may refer to the above description of the method embodiments.

An embodiment of the present disclosure further provides a computer-readable storage medium for storing computer program instructions that, when executed by a processor, cause the processor to implement the method. The computer-readable storage medium may be a volatile computer-readable storage medium or a non-volatile computer-readable storage medium.

An embodiment of the present disclosure further provides an electronic device, including a processor and a memory for storing instructions executable by the processor. The processor is configured to invoke the instructions stored in the memory to perform the above method.

An embodiment of the present disclosure further provides a computer program product including computer-readable codes, or a non-volatile computer-readable storage medium having stored thereon the computer-readable codes. When the computer-readable codes are run in a processor of an electronic device, the processor in the electronic device is caused to perform the above method.

The electronic device can be provided as a terminal, a server or other forms of devices.

Figure 16:
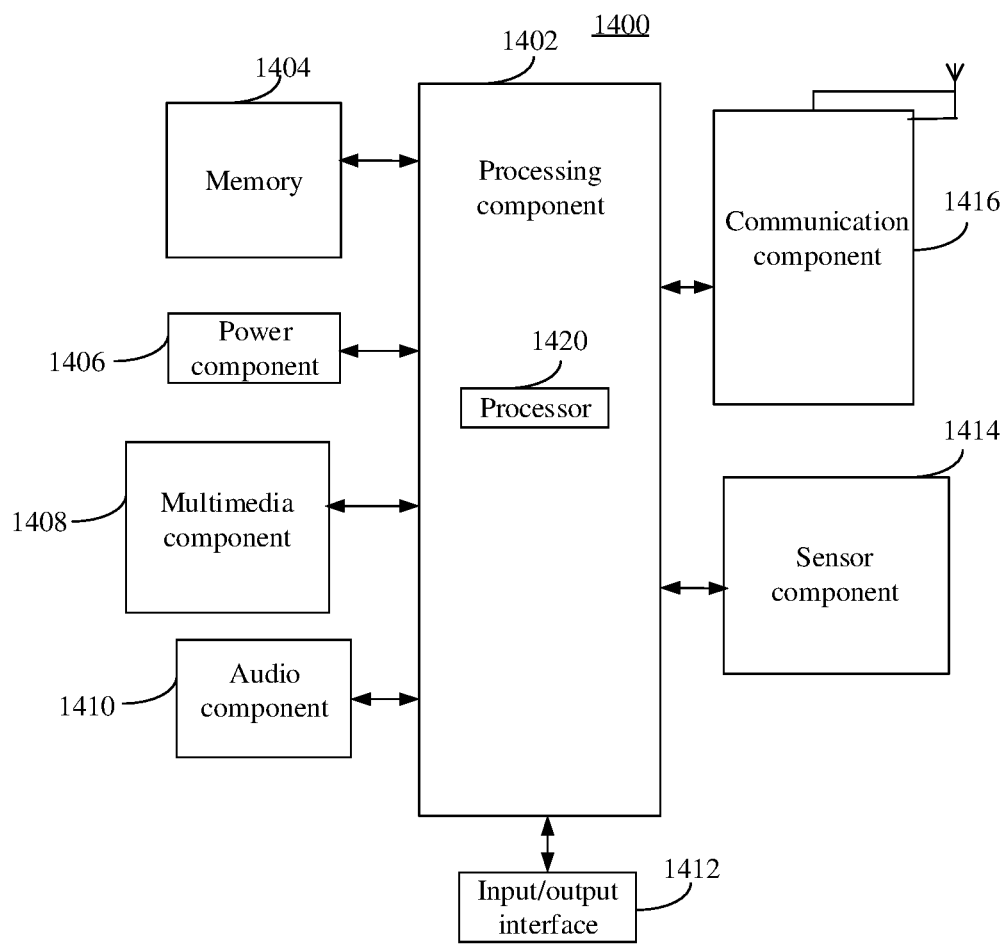
FIG. 16 illustrates a block diagram of an electronic device provided by an embodiment of the present disclosure.

FIG. 16 illustrates a block diagram of an electronic device 1400 provided by an embodiment of the present disclosure. For example, the electronic device 1400 may be a terminal such as a mobile phone, a computer, a digital broadcast terminal, a messaging transceiver device, a gaming console, a tablet device, a medical device, exercise equipment and a PDA.

Referring to FIG. 16, the electronic device 1400 may include one or more of following components: a processing component 1402, a memory 1404, a power component 1406, a multimedia component 1408, an audio component 1410, an Input/Output (I/O) interface 1412, a sensor component 1414 and a communication component 1416.

The processing component 1402 typically controls overall operations of the electronic device 1400, such as the operations associated with display, telephone calls, data communications, camera operations, and recording operations. The processing component 1402 may include one or more processors 1420 to execute instructions to perform all or part of the operations in the above methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 may store various types of data to support the operation on the electronic device 1400. Examples of such data include instructions for any application or method operated on the electronic device 1400, contact data, phonebook data, messages, pictures, videos, and the like. The memory 1404 may be implemented by using any type of volatile or non-volatile memory device, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk or the like.

The power component 1406 may provide power to various components of the electronic device 1400. The power component 1406 may include a power management system, one or more power sources, and any other components associated with the generation, management, and distribution of power in the electronic device 1400.

The multimedia component 1408 may include a display screen providing an output interface between the electronic device 1400 and the user. In some embodiments, the display screen may include a liquid crystal display (LCD) and a touch panel (TP). If the display screen includes the touch panel, the display screen may be implemented as a touch screen to receive input signals from the user. The touch panel may include one or more sensors to sense touches, sliding, and/or other gestures on the touch panel. The touch sensors may not only sense a boundary of a touch or sliding action, but also detect a period of time and a pressure associated with the touch or sliding action. In some embodiments, the multimedia component 1408 includes at least one of a front camera or a rear camera. The front camera and/or the rear camera may collect external multimedia data when the electronic device 1400 is in an operation mode such as a photographing mode or a video mode. Each of the front camera and the rear camera may be a fixed optical lens system or have a focal distance and optical zoom capability.

The audio component 1410 may output and/or input audio signals. For example, the audio component 1410 may include a microphone (MIC). The microphone may collect an external audio signal when the electronic device 1400 is in an operation mode, such as a call mode, a recording mode, and a voice recognition mode. The collected audio signal may be stored in the memory 1404 or transmitted via the communication component 1416. In some embodiments, the audio component 1410 further includes a speaker configured to output audio signals.

The I/O interface 1412 may provide an interface between the processing component 1402 and peripheral apparatus. The peripheral apparatus may be a keyboard, a click wheel, buttons, and the like. The buttons may include, but are not limited to, a home button, a volume button, a starting button, and a locking button.

The sensor component 1414 includes one or more sensors for providing the electronic device 1400 with various aspects of state evaluation. For example, the sensor component 1414 can detect the on/off state of the electronic device 1400 and the relative positioning of the components. For example, the component is the display and the keypad of the electronic device 1400. The sensor component 1414 can also detect the position change of a component of the electronic device 1400 or the electronic device 1400, the presence or absence of contact between the user and the electronic device 1400, the orientation or acceleration/deceleration of the electronic device 1400, and the temperature change of the electronic device 1400. The sensor component 1414 may include a proximity sensor configured to detect the presence of nearby objects when there is no physical contact. The sensor component 1414 may also include a light sensor, such as a complementary metal oxide semiconductor (CMOS) or charge-coupled device (CCD) image sensor, for use in imaging applications. In some embodiments, the sensor component 1414 may also include an acceleration sensor, a gyroscope sensor, a magnetic sensor, a pressure sensor or a temperature sensor.

The communication component 1416 may be configured to facilitate wired or wireless communication between the electronic device 1400 and another apparatus. The electronic device 1400 may access a communication-standard-based wireless network, such as a Wireless Fidelity (WiFi) network, a 2nd-Generation (2G) or 3rd-Generation (3G) network or a combination thereof. In an exemplary embodiment, the communication component 1416 may receive a broadcast signal or broadcast associated information from an external broadcast management system via a broadcast channel. In an exemplary embodiment, the communication component 1416 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In an exemplary embodiment, the electronic device 1400 may be implemented as one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, to implement the above any method.

In an exemplary embodiment, there is further provided a non-transitory computer-readable storage medium, such as a memory 1404 including computer program instructions. The computer program instructions, when being executed by the processor 1420 of the electronic device 1400, cause the processor to complete the above methods.

Figure 17:
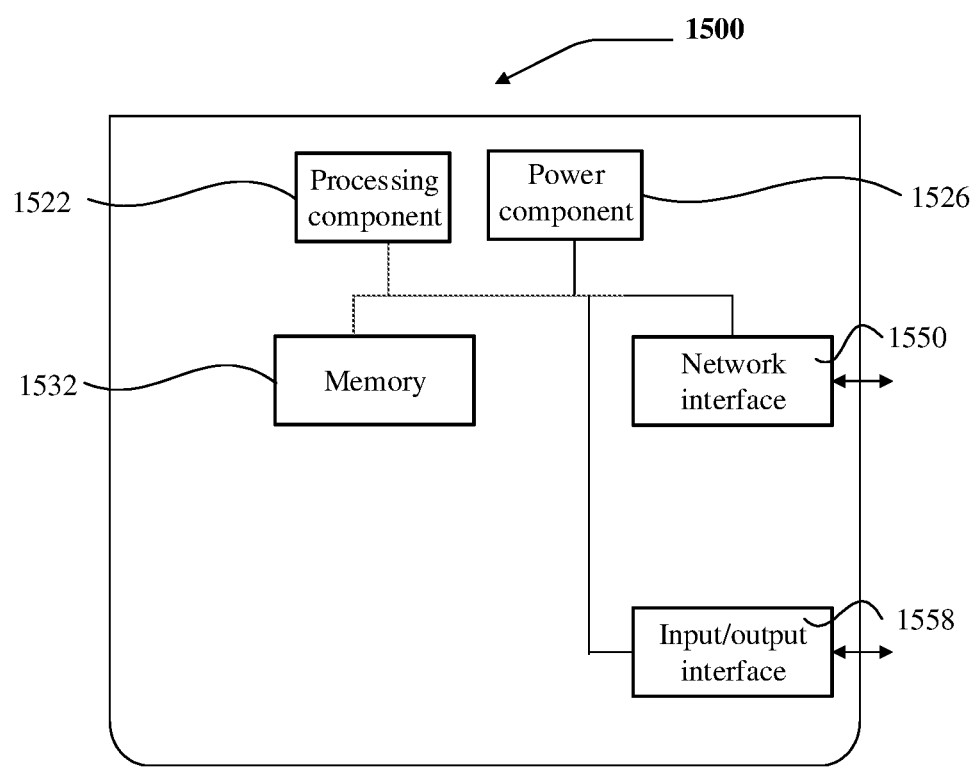
FIG. 17 illustrates a block diagram of an electronic device provided by an embodiment of the present disclosure.

FIG. 17 illustrates a block diagram of an electronic device 1500 provided by an embodiment of the present disclosure. For example, the electronic device 1500 may be provided as a server. Referring to FIG. 17, the electronic device 1500 may include a processing component 1522 which includes one or more processors and a memory resource represented by a memory 1532. The memory resource is configured to store instructions (for example, application programs) executable by the processing component 1522. Application programs stored in the memory 1532 may include one or more modules, each of which corresponds to a set of instructions. The processing component 1522 may execute the instructions to implement the above methods.

The electronic device 1500 may further include: a power component 1526 configured to execute power management of the electronic device 1500; a wired or wireless network interface 1550 configured to connect the electronic device 1500 to a network; and an I/O interface 1558. The electronic device 1500 may be operated based on an operating system stored in the memory 1532, for example, Microsoft server operating system (Windows Server™), graphical user interface based operating system provided by the Apple Company (Mac OS X™), multi-user and multi-process computer operating system (Unix™), free and open source code like operating system (Linux™), open source code Unix-like operating system (FreeBSD™) or the like.

In an exemplary embodiment, a non-transitory computer-readable storage medium (such as the memory 1532 including computer program instructions) may further be provided. The computer program instructions are executed by the processing component 1522 in the electronic device 1500 to implement the above methods.

The present disclosure may be implemented as a system, a method and/or a computer program product. The computer program product may include a computer-readable storage medium having stored thereon computer-readable program instructions configured to enable a processor to implement various aspects of the present disclosure.

The computer-readable storage medium may be a tangible device that can hold and store instructions used by the instruction execution device. The computer-readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage medium include: a portable computer disk, a hard disk, a random access memory (RAM), a read only memory (ROM), an erasable programmable read only memory (EPROM or a flash memory), a static random access memory (SRAM), a portable compact disk read-only memory (CD-ROM), a digital versatile disk (DVD), a memory stick, a floppy disk, a mechanical encoding device, such as a punch card or a protruding structure in the groove that store instructions, and any suitable combination of the above. The computer-readable storage medium used here is not interpreted as a instantaneous signal itself, such as radio waves or other freely propagating electromagnetic waves, electromagnetic waves transmitted through waveguides or other transmission media (for example, light pulses transmitted through fiber optic cables), or electrical signals transmitted through electric wires.

The computer-readable program instructions described herein can be downloaded from a computer-readable storage medium to various computing/processing device, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. The network adapter card or network interface in each computing/processing device receives computer-readable program instructions from the network, and forwards the computer-readable program instructions for storage in the computer-readable storage medium in each computing/processing device.

The computer program instructions used to perform the operations of the present disclosure may be assembly instructions, instruction set architecture (ISA) instructions, machine instructions, machine-related instructions, microcode, firmware instructions, status setting data, or source codes or object codes written by any combination of one or more programming languages, where the programming language includes object-oriented programming languages such as Smalltalk, C++, and the like, and conventional procedural programming languages such as "C" language or similar programming languages. Computer-readable program instructions can be executed entirely on the computer of the user, partly on the computer of the user, executed as a stand-alone software package, partly on the computer of the user and partly on a remote computer, or entirely on the remote computer or a server. In the case related to the remote computer, the remote computer can be connected to the computer of the user through any kind of network, including a local area network (LAN) or a wide area network (WAN), or the remote computer can be connected to an external computer (for example, using an Internet service provider to provide an Internet connection). In some embodiments, an electronic circuit, such as a programmable logic circuit, a field programmable gate array (FPGA), or a programmable logic array (PLA), can be customized by using the status information of the computer-readable program instructions. The electronic circuit may perform computer-readable program instructions to realize various aspects of the present disclosure.

Herein, various aspects of the present disclosure are described with reference to flowcharts and/or block diagrams of methods, apparatus (systems) and computer program products according to the embodiments of the present disclosure. It should be understood that each block of the flowchart and/or block diagram and the combination of flows in the flowchart and/or blocks in block diagram can be implemented by computer readable program instructions.

These computer-readable program instructions can be provided to a processor of a general-purpose computer, a special-purpose computer, or other programmable data processing apparatus, thereby producing a machine that makes these instructions, when executed by the processor of the computer or other programmable data processing apparatus, produce an apparatus that implements the functions/actions specified in one or more blocks in the flowchart and/or block diagram. It is also possible to store these computer-readable program instructions in a computer-readable storage medium. These instructions make computers, programmable data processing apparatus, and/or other apparatus work in a specific manner, so that the computer-readable medium storing instructions includes a manufacture, which includes instructions for implementing various aspects of the functions/actions specified in one or more blocks in the flowchart and/or the block diagram.

It is also possible to load computer-readable program instructions on a computer, other programmable data processing apparatuses, or other devices, so that a series of operations are executed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the drawings illustrate probably implemented system architectures, functions and operations of the systems, methods and computer program products according to various embodiments of the present disclosure. On this aspect, each block in the flowcharts or the block diagrams may represent part of a module, a program segment or an instruction, and the part of the module, the program segment or the instruction includes one or more executable instructions configured to realize a specified logical function. In some alternative implementations, the functions marked in the blocks may also be realized in an order different from those marked in the drawings. For example, two continuous blocks may actually be executed substantially concurrently or may be executed in a reverse order sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation, or may be implemented by a combination of a special hardware and computer instructions.

The computer program product can be specifically implemented by hardware, software or a combination thereof. In an optional embodiment, the computer program product is specifically embodied as a computer storage medium. In another optional embodiment, the computer program product is specifically embodied as a software product, such as a software development kit (SDK).

The embodiments of the present disclosure have been described above, the above description is exemplary, not exhaustive, and is not limited to the disclosed embodiments. Without departing from the scope and spirit of the illustrated embodiments, many modifications and changes are obvious to those of ordinary skilled in the art. The choice of terms used herein is intended to best explain the principles, practical applications, or improvements to the technology in the market for each embodiment, or to enable other ordinary skilled in the art to understand the various embodiments disclosed herein.

The invention claimed is:

1. A method for video processing, comprising:
   determining a target frame in a video to be processed;
   respectively determining at least two first energy images corresponding to the target frame based on at least two preset macro block sizes, each of the at least two first energy images representing alternating current energy of at least one first macro block corresponding to a respective one of the at least two preset macro block sizes, wherein the at least one first macro block is obtained by segmenting the target frame based on the respective one of the at least two preset macro block sizes;
   determining a first energy map corresponding to the target frame based on the at least two first energy images, wherein the first energy map represents energy distribution in the target frame;
   determining, based on the first energy map, an adaptive quantization parameter corresponding to the target frame and encoding the target frame by using the adaptive quantization parameter; and
   respectively determining at least two second energy images corresponding to the target frame based on the at least two preset macro block sizes, each of the at least two second energy images representing alternating energy of at least one second macro block corresponding to a respective one of the at least two preset macro block sizes, wherein the at least one second macro block is obtained by shifting and segmenting the target frame based on the respective one of the at least two preset macro block sizes;
   wherein determining the first energy map corresponding to the target frame based on the at least two first energy images comprises:
      determining a second mean value of the at least two first energy images and the at least two second energy images at a same pixel position; and
      determining the first energy map based on second mean values corresponding to all pixel positions.

2. The method of claim 1, wherein respectively determining the at least two first energy images corresponding to the target frame based on the at least two preset macro block sizes comprises:
   for each of the at least two preset macro block sizes, segmenting the target frame based on the preset macro block size to obtain a plurality of first macro blocks;
   determining alternating current energy of each of the plurality of first macro blocks; and
   determining a corresponding first energy image based on the plurality of first macro blocks obtained by segmenting the target frame based on a same macro block size, pixel values in the corresponding first energy image being respective alternating current energy of the plurality of first macro blocks.

3. The method of claim 2, wherein determining the alternating current energy of each of the plurality of first macro blocks comprises:
   determining the alternating current energy corresponding to the first macro block based on variance of all pixel values and a number of pixels in the first macro block.

4. The method of claim 1, wherein respectively determining the at least two second energy images corresponding to the target frame based on the at least two preset macro block sizes comprises:
  performing, based on each of the at least two preset macro block sizes, shifting processing on the target frame, to obtain a plurality of shifted frames; and
  determining respective second energy images of the plurality of shifted frames respectively corresponding to the at least two preset macro block sizes.

5. The method of claim 4, wherein performing, based on each of the at least two preset macro block sizes, the shifting processing on the target frame to obtain the plurality of shifted frames comprises:
  scaling, based on a preset scaling ratio, the at least two preset macro block sizes to obtain corresponding shifting sizes; and
  performing, based on each of the corresponding shifting sizes, shifting processing on the target frame to obtain the plurality of shifted frames.

6. The method of claim 5, wherein performing, based on each of the corresponding shifting sizes, the shifting processing on the target frame to obtain the plurality of shifted frames comprises:
  for each of the corresponding shifting sizes, adding a quantity of pixel rows and pixel columns at two adjacent sides of the target frame respectively by copying the two adjacent sides, the quantity of the added pixel rows and pixel columns corresponding to the shifting size, and copying a pixel at an intersection position of the two adjacent sides to a blank area between the added pixel rows and pixel columns, to obtain a corresponding candidate shifted frame; and
  cropping a quantity of pixel rows and pixel columns at two sides not being copied of the candidate shifted frame to obtain a corresponding shifted frame, the quantity of the cropped pixel rows and pixel columns corresponding to the shifting size.

7. The method of claim 4, wherein determining the respective second energy images of the plurality of shifted frames respectively corresponding to the at least two preset macro block sizes comprises:
  segmenting, based on each of the at least two preset macro block sizes, a shifted frame corresponding to the preset macro block size to obtain a plurality of second macro blocks;
  determining alternating current energy of each of the plurality of second macro blocks; and
  determining a corresponding second energy image based on the plurality of second macro blocks corresponding to a same shifted frame, pixel values in the corresponding second energy image being respective alternating current energy of the plurality of second macro blocks.

8. The method of claim 1, wherein determining, based on the first energy map, the adaptive quantization parameter corresponding to the target frame and encoding the target frame by using the adaptive quantization parameter comprises:
  determining a second energy map corresponding to the first energy map by means of average pooling; and
  determining, based on the second energy map, the adaptive quantization parameter corresponding to the target frame and encoding the target frame by using the adaptive quantization parameter.

9. The method of claim 8, wherein determining the second energy map corresponding to the first energy map by means of the average pooling comprises:
  determining a target macro block size; and
  performing, by taking the target macro block size as a window and a stride, the average pooling on the first energy map to obtain the second energy map.

10. The method of claim 8, wherein determining, based on the second energy map, the adaptive quantization parameter corresponding to the target frame and encoding the target frame by using the adaptive quantization parameter comprises:
  determining a histogram mapping table corresponding to the second energy map;
  mapping the second energy map based on the histogram mapping table to obtain the adaptive quantization parameter corresponding to the target frame; and
  inputting the adaptive quantization parameter and the target frame into a video encoder for performing, based on the corresponding adaptive quantization parameter, video encoding on the target frame.

11. The method of claim 1, wherein the at least two preset macro block sizes are set based on a fixed ratio.

12. The method of claim 1, wherein determining the target frame in the video to be processed comprises:
  determining the target frame from the video to be processed in sequence in a timeline order.

13. An electronic device, comprising:
  a processor; and
  a memory for storing instructions that, when executed by the processor, cause the processor to:
  determine a target frame in a video to be processed;
  determine at least two first energy images corresponding to the target frame based on at least two preset macro block sizes, respectively, each of the at least two first energy images representing alternating current energy of at least one first macro block corresponding to a respective one of the at least two preset macro block sizes, wherein the at least one first macro block is obtained by segmenting the target frame based on the respective one of the at least two preset macro block sizes;
  determine a first energy map corresponding to the target frame based on the at least two first energy images, wherein the first energy map represents energy distribution in the target frame;
  determine, based on the first energy map, an adaptive quantization parameter corresponding to the target frame and encode the target frame by using the adaptive quantization parameter; and
  respectively determine at least two second energy images corresponding to the target frame based on the at least two preset macro block sizes, each of the at least two second energy images representing alternating energy of at least one second macro block corresponding to a respective one of the at least two preset macro block sizes, wherein the at least one second macro block is obtained by shifting and segmenting the target frame based on the respective one of the at least two preset macro block sizes;
  wherein the processor is further configured to:
    determine a second mean value of the at least two first energy images and the at least two second energy images at a same pixel position; and
    determine the first energy map based on second mean values corresponding to all pixel positions.

14. The electronic device of claim 13, wherein the processor is configured to:
- for each of the at least two preset macro block sizes, segment the target frame based on the preset macro block size to obtain a plurality of first macro blocks;
- determine alternating current energy of each of the plurality of first macro blocks; and
- determine a corresponding first energy image based on the plurality of first macro blocks obtained by segmenting the target frame based on a same macro block size, pixel values in the corresponding first energy image being respective alternating current energy of the plurality of first macro blocks.

15. The electronic device of claim 13, wherein the processor is configured to:
- perform, based on each of the at least two preset macro block sizes, shifting processing on the target frame, to obtain a plurality of shifted frames; and
- determine respective second energy images of the plurality of shifted frames respectively corresponding to the at least two preset macro block sizes.

16. A non-transitory computer-readable storage medium having stored thereon computer program instructions that, when executed by a processor, cause the processor to perform the following operations including:
- determining a target frame in a video to be processed;
- respectively determining at least two first energy images corresponding to the target frame based on at least two preset macro block sizes, each of the at least two first energy images representing alternating current energy of at least one first macro block corresponding to a respective one of the at least two preset macro block sizes, wherein the at least one first macro block is obtained by segmenting the target frame based on the respective one of the at least two preset macro block sizes;
- determining a first energy map corresponding to the target frame based on the at least two first energy images, wherein the first energy map represents energy distribution in the target frame;
- determining, based on the first energy map, an adaptive quantization parameter corresponding to the target frame and encoding the target frame by using the adaptive quantization parameter; and
- respectively determining at least two second energy images corresponding to the target frame based on the at least two preset macro block sizes, each of the at least two second energy images representing alternating energy of at least one second macro block corresponding to a respective one of the at least two preset macro block sizes, wherein the at least one second macro block is obtained by shifting and segmenting the target frame based on the respective one of the at least two preset macro block sizes;
- wherein determining the first energy map corresponding to the target frame based on the at least two first energy images comprises:
  - determining a second mean value of the at least two first energy images and the at least two second energy images at a same pixel position; and
  - determining the first energy map based on second mean values corresponding to all pixel positions.

* * * * *